Patented Aug. 23, 1927.

1,639,861

UNITED STATES PATENT OFFICE.

JOHN SCHWAB, JR., OF WINNIPEG, MANITOBA, CANADA.

PROCESS OF MAKING A RUBBER COMPOSITION FOR LINING TUBES AND USING THE SAME.

No Drawing.    Application filed June 24, 1925. Serial No. 39,323.

I might initially state that as far as I am aware, at the present time there is difficulty experienced with what are generally known as puncture proofing or healing compositions due to the fact that in time they become either too stiff or too liquid. Obviously if in time they become too stiff to flow they will not heal the puncture and if they become too liquid the pressure of the air in the tube will blow the healing composition through the puncture. I might mention also that the pressure of the air in the tube and temperature conditions together with the element of time all act to make it difficult to provide a rubber healing or puncture proofing composition which can be relied upon for an indefinite time.

In providing a rubber composition for lining a tube and in accordance with my invention, I make primarily two mixtures, the first mixture comprising twelve parts of rubber melted by heat and which may be either melted vulcanized rubber or melted raw rubber, six parts of vulcanizing cement and one part of honey, these ingredients being mixed cold. The rubber is melted in any conventional manner, such as, for example, in the manner disclosed in Patent 146,387, granted January 13, 1874. The second mixture comprises one part of vulcanizing cement and one part of sulphur mixed together when cold.

Having provided these two initial mixtures, I then take equal amounts of the separate mixtures and mix them together to make what I will now call a third mixture. This third mixture is heated to a temperature above boiling point for say about twenty-five minutes. The heating is preferably carried out in a steam heated boiler. This heating evaporates any water and any gasoline or such like in the said third mixture.

When the said third mixture has cooled below boiling point, I add and mix well into it vulcanizing cement in such quantity that the added vulcanizing cement equals approximately one third of the then formed mixture. It will be particularly noted that the mixture is not heated above boiling point after the last vulcanizing cement is added.

After the final mixture has cooled for a short period of time say five minues, it is ready to be placed in an inner automobile tube. I find it desirable to force the mixture by a force pump through the valve stem of the tube. When a sufficient quantity of the final mixture has been put into the tube, the amount being determined by experience, it is desirable to place the tube flat on say a table and roll it whilst the healing composition therein is still warm. One then cleans out the valve stem and puts the valve in and then inflates the tube with air. The air spreads the tube, the inner wall of which is at this time coated with the composition. The inflated tube is then rolled with a roller as I find that this has the further effect of evenly distributing the composition over the entire inner wall of the tube.

This being completed, the tube is left for about twenty-four hours before it is used. I have found that a tube having my mixture therein is puncture proof as the mixture is of such a nature that it retains its original condition in the tube and is not susceptible to temperature or pressure changes and does not harden in the space of time. Further the composition so provided is not in any way destructive to the rubber of the tube.

What I claim as my invention is:—

1. The process of making a rubber composition for lining tubes which consists in providing a mixture of melted rubber, vulcanizing cement and sulphur, heating the mixture for a period of time at a temperature above boiling point, then permitting the mixture to cool to a temperature below boiling point at which time a quantity of vulcanizing cement is added to and thoroughly mixed to form the final lining composition.

2. The process of making a rubber composition for lining tubes which consists in providing a mixture of melted rubber, vulcanizing cement, honey and sulphur, heating the mixture at a temperature above boiling point for a period of time and finally adding a quantity of vulcanizing cement to the mixture after it has cooled to a temperature below boiling point.

3. The process of making a rubber composition for lining tubes which consists in providing a first mixture comprising melted raw rubber and vulcanizing cement, then providing a second mixture of vulcanizing cement and sulphur, then thoroughly mixing the two mixtures together to form a third mixture, subsequently heating the third mixture for a period of time at a temperature above boiling point and finally adding a quantity of vulcanizing cement to the last mixture after its temperature has dropped below boiling point.

4. The process of making a rubber composition for lining tubes which consists in providing a first mixture comprising melted raw rubber, vulcanizing cement and honey, then providing a second mixture of vulcanizing cement and sulphur, then thoroughly mixing the two mixtures together to form a third mixture, subsequently heating the third mixture for a period of time at a temperature above boiling point and finally adding a quantity of vulcanizing cement to the last mixture after its temperature has dropped below boiling point.

5. The process of making a rubber composition for lining tubes which consists in providing a first mixture consisting of twelve parts of melted rubber, six parts of vulcanizing cement and one part of honey, then providing a second mixture of one part of vulcanizing cement and one part of sulphur, then mixing together equal parts of the aforesaid mixtures to provide a third mixture, then heating the third mixture a period of time at a temperature above boiling point and finally adding a quantity of vulcanizing cement to the third mixture after the temperature has dropped below boiling point, the quantity of vulcanizing cement latterly added being approximately equal to one third of the whole mass.

Signed at Winnipeg this 27th day of May 1925.

JOHN SCHWAB, Junior.